US00RE33802E

United States Patent [19]

Whitehead et al.

[11] E Patent Number: Re. 33,802

[45] Reissued Date of Patent: Jan. 21, 1992

[54] NUMBERED DOCUMENTS

[75] Inventors: Colin J. Whitehead; Robin Bratchley; John M. Haslop, all of Berkshire, England

[73] Assignee: Thomas De La Rue & Co., England

[21] Appl. No.: 315,464

[22] Filed: Feb. 24, 1989

Related U.S. Patent Documents

Reissue of:

[64] Patent No.: 4,645,240
Issued: Feb. 24, 1987
Appl. No.: 726,598
Filed: Apr. 23, 1985

[51] Int. Cl.[5] ..... G09F 3/00

[52] U.S. Cl. ..... 283/74; 283/80; 283/53; 283/57; 283/78

[58] Field of Search ..... 283/67, 70, 72, 74, 283/75, 53, 57, 58, 80; 101/77, 85, 86

[56] References Cited

U.S. PATENT DOCUMENTS

| | | | |
|---|---|---|---|
| 381,105 | 4/1888 | Black | 101/77 |
| 489,561 | 1/1893 | Hopkins | 283/58 |
| 1,564,296 | 3/1920 | Tiefel | 283/58 |
| 1,624,552 | 4/1927 | Kirkegaard et al. . | |
| 1,833,391 | 12/1928 | De Giorgio | 101/20 |
| 2,842,054 | 7/1958 | Monger | 283/72 |
| 3,159,101 | 12/1964 | Dziekan . | |
| 3,363,548 | 1/1968 | Aijima . | |
| 3,757,688 | 9/1973 | Weber . | |
| 4,207,814 | 6/1980 | Schenk . | |
| 4,234,214 | 11/1980 | Lee | 283/57 |

FOREIGN PATENT DOCUMENTS

| | | | |
|---|---|---|---|
| 523276 | 4/1931 | Fed. Rep. of Germany . | |
| 692505 | 11/1930 | France | 283/72 |
| 1177718 | 3/1957 | France . | |
| 333540 | 12/1958 | Switzerland | 283/58 |
| 351095 | 3/1930 | United Kingdom . | |
| 1580553 | 8/1977 | United Kingdom . | |
| 1559693 | 1/1980 | United Kingdom | 283/72 |

OTHER PUBLICATIONS

Australasian Printer, Oct. 1982, pp. 47.

Force Co., 1000 *S F M Universal Rotary Numbering Head Component System*, pp. 32–33.

*Primary Examiner*—Paul A. Bell

*Attorney, Agent, or Firm*—Ostrolenk, Faber, Gerb & Soffen

[57] ABSTRACT

This invention relates to documents, such as banknotes, which are produced and used in large numbers and which, for a given series, are identical one with another except for a unique multi-digit number upon each individual document, the number thus uniquely identifying that document within the series. According to the present invention, to render unauthorized reproduction of the document more difficult, on each document, at least two characters in the identifying number differ from each other (in addition to any differences in the letters or digits which they represent) in one or more visible characteristics. Thus the differing characters may have different heights or widths or be in different styles of type. Preferably, the identifying number appears twice on each document; in diagonally opposite corners, and preferably the variation of physical characteristics of the characters along the length of one of the numbers is reversed in direction in the other of the numbers.

8 Claims, 2 Drawing Sheets

NUMBERED DOCUMENTS

Figure 1:
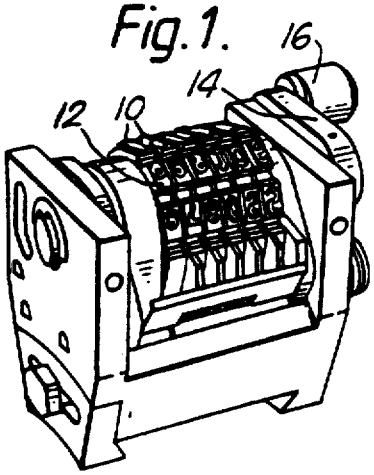

Matter enclosed in heavy brackets [ ] appears in the original patent but forms no part of this reissue specification; matter printed in italics indicates the additions made by reissue.

This invention relates to documents of the kinds which are produced and used in large numbers and which, for any given series, are identical one with another, except for a unique multi-digit number upon each individual document. In this specification the word "number" is to be taken to mean something which is wholly numerical, or is wholly composed of letters of the alphabet, or is a combination of numerical digits and "alpha" digits. The invention also extends to a method and means for applying such "numbers" to documents of the aforesaid kinds.

Generally, the documents to which this invention relates are numbered consecutively, adjacently produced documents differing from each other by one digit or letter in a readily recognized series, but the invention is not restricted to such serial numbering.

The documents may be of any desired kind and, most commonly, the numbering thereof will be for purposes associated with the security and/or administration of the documents, either in their production or in their use. By way of example, security documents, such as banknotes, bonds, warrants, share certificates, vouchers and lottery tickets will each be uniquely identifiable by the number or number thereupon.

The documents to which this invention relates are most commonly numbered, during or after production, by means of number printing machines, sometimes called "numbering boxes" or "numbering barrels", which are adapted to print the number in a desired position or positions upon each document and to change, in a predetermined sequence and between documents, the number to be printed by the machines. However, numbering may be effected by other means, including both other mechanical means and electronically controlled systems such as are used in ink-jet printing and in laser-utilising methods and means.

Any person who attempts the unauthorized reproduction of a security document is faced with a large number of problems, one of which is that each document in a given series of genuine documents bears its own unique multi-digit number in one or more places thereupon. He may attempt to overcome this problem in a number of ways. For example, he may regard it as sufficient in some circumstances, to produce a plurality of documents, all of which bear identical multi-digit numbers, this may be done by the repetitive use of a printing plate made from a photograph which includes the multi-digit number of one arbitrarily selected genuine document. However, once it is known that an unauthorised reproduction has been made, it is easier to detect further copies if they all bear the same number.

Another possible solution involves the manufacture and use of a printing plate for printing some only of the digits of a "genuine" or officially used multi-digit number (for example, the first three digits thereof) and the later insertion of the missing digit or digits, by suitably positioning the authorized and partially numbered document so that it receives desired impressions from a numbering box or from some other printing means or system.

A still further solution also involves the printing of a part of the multi-digit number from a printing plate with fixed digits. By altering the side-lay, i.e. the relative position of the printing means and the document being printed, the part numbers upon the plate may be printed so that they occupy different positions or locations within the multi-digit number. Thus, by the use of a limited number of plates with fixed "part-numbers" in conjunction with different combinations of side-lay adjustment, a relatively large number of different multi-digit numbers may be obtained with a small number of part-number printing operations, the missing number or numbers again must be filed by numbering boxes, for example, as mentioned in the preceding paragraph.

Whatever the method employed, the aim of the producer of the unauthorised document is to make its appearance, including the appearance of the identifying numbers, approximate closely to the appearance of the genuine document.

The object of this invention is substantially to increase the difficulties faced by the unauthorised reproducer by such documents.

According to this invention a document, which is one of a series of documents which are identical in content except for a number made up of a set of alphabetical or numerical characters, which number uniquely identifies each document within the series, is characterized in that at least two characters of the identifying number differ from each other, in addition to any differences in the letters or digits which they represent, in one or more visible physical characteristics.

The digits may, for example, differ in their heights, their widths, or their type styles, or in any combination of these. The pitch of the digits of the multi-digit number may be constant or may vary. When the digits vary from digit to digit in a characteristic which is progressively variable (e.g. height), such variation may be in a progressive manner, from one end of the multi-digit number of the other.

The identifying number may be repeated on the document. Preferably it appears in diametrically opposite corners of the document, so that if a corner or strip of the document is torn away the identifying number is left on the remainder. The direction of variation of the physical characteristics is preferably opposite in the two representations of the number. For example, if in one representation of the number the digits increase in size from one digit to the next in a left-to-right direction, in the other representation of the same number on the same document the digit sizes decrease in the left-to-right direction.

The multi-digit number may be displayed either horizontally and/or vertically on the document. The digits of the multi-digit number may be printed in one or more different colours in a single printing operation.

The multi-digit number may comprise two separate numbers, each of which forms part of a different overall series of numbers.

The invention also consists in a set of such documents and in a method and apparatus for their production.

Documents according to this invention will require an unauthorised reproducer to devote considerably more time, effort and expenditure that would be required for the reproduction of standard forms of multi-digit identification numbers. He will need to make many more printing plates than previously required and, in any infilling operation, is likely to have problems in obtaining or making the required type. The varying physical characteristics of the digits required for this invention are such that an illicit reproducer cannot use, either wholly or partly, a commercially available number box. If the reproduction is not of high quality, it will be readily detectable, and the variations in type faces, and the dispositions of the various forms of the digits of a genuine document, may render uneconomic attempts at high quality unauthorised copying.

In order that the invention may be better understood, some embodiments will now be described with the reference to the accompanying drawings in which FIG. 1 is a diagrammatic representation of a numbering box for printing the numbers on documents and FIGS. 2 to 7 are diagrammatic representations of documents on which only the identification numbers are illustrated.

In FIG. 1 there is shown a rotary numbering machine having a number of type rings 10, each of which includes a number of type faces 12 angularly spaced about the common axis of the rings. Each ring is angularly adjustable to bring any of the type faces into printing position. Each type face carries a digit.

An operating lever 14 is fitted with a cam follower roller 16. A cam on the printing equipment lifts the cam follower roller up and down to cause the type rings to be indexed with the printing of each document. Such indexing normally causes the numerical value of the whole number to increase by one with each indexing step.

In this example, the height and width of the digits are the same for all type faces of a single ring but the digit height and width differ from ring to ring. Also, in this example, there is a progressive variation in height and width from one end ring to the other end ring.

If the number is to be repeated on each document, it is advantageous to provide two such numbering machines in which the variation of digit height and width is in opposite directions.

The documents of FIGS. 2 to 6 each include a six-digit number printed in each of two diagonally opposite corners.

Figure 2:
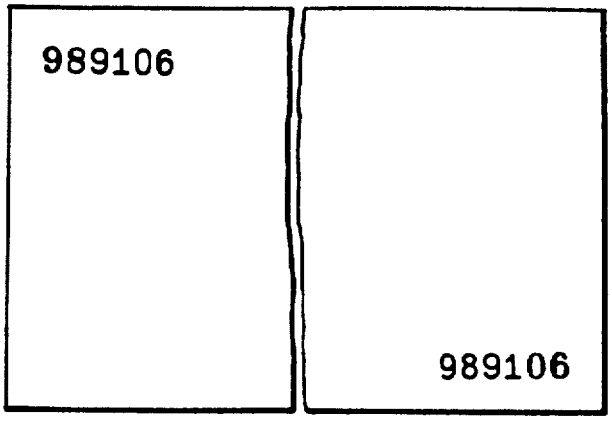

Referring now to FIG. 2, each of the six digits has the same height but the style or design of the digits differs as follows. Describing firstly the number in the top left-hand corner of the document, the figures "9 and 8" are both of a first type style, giving a heavy print. The figures "9 and 1" are both of a second lighter type style and figures "0 and 6" are both of a third, yet lighter, type style. The same number is printed in the bottom right-hand corner of the document, but in this case the order of styles if reversed so that "9 and 8" are printed in the lightest type style and "0 and 6" in the heaviest type style.

Figure 3:
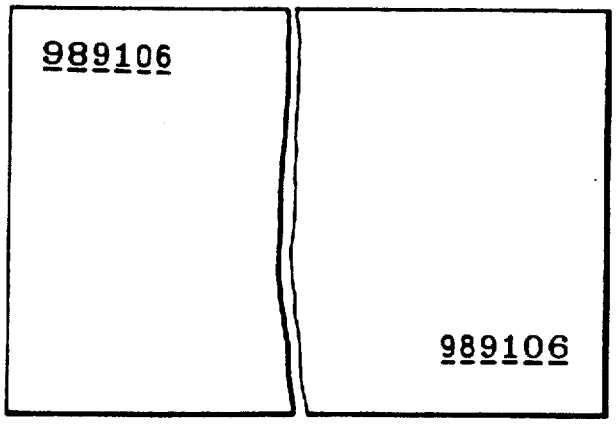

In the document of FIG. 3 all the digits of the numbers are of the same height and, again, the styles vary in pairs. Considering firstly the top left-hand number, "9 and 8" are both printed in a fourth type style. "9 and 1" are in the above-mentioned first type style and "0 and 6" in the above-mentioned third type style. Additionally at a given distance below each digit there is printed a discrete line having a predetermined thickness. In the bottom right-hand corner, the same number is printed with reversed styles. Again the digits are underlined. In each case the underlining of the number as a whole is discontinuous.

Figure 4:
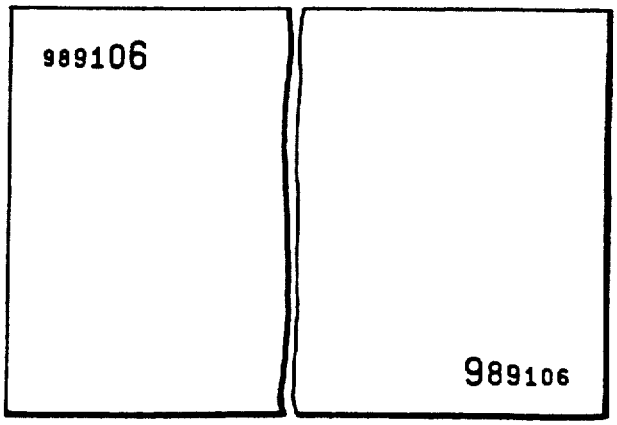

In the document of FIG. 4, at the top left-hand corner the heights of the digits, which are all in a fifth type style, vary smoothly from digit to digit, with the smallest digit "9" at the left-hand end and the largest digit "6" at the right-hand end.

In the bottom right-hand number, the direction of graduation of the height of the digits is reversed so that the largest digit is the first 37 9" and the smallest digit is the final "6". The pitch between the adjacent digits of varying height is such that the visual appearance of these multi-digit numbers is the more aesthetically acceptable.

Figure 5:
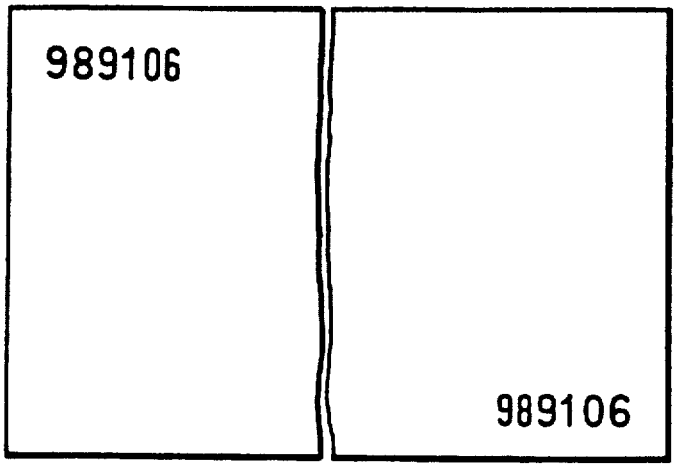

In the document FIG. 5, the digits of the printed numbers are of a constant height. However, the widths of the digits vary, in parts. In the top left-hand number the middle two digits "9" and "1" have a first (standard) width but the first two digits "9" and 8" have expanded widths and the final digits "0 and 6" have condensed widths. In the bottom right-hand number the condensed width is to be seen in the first "9" and "8" and the expanded width in the final "0" and "6", the middle digits being again of the standard width.

Figure 6:
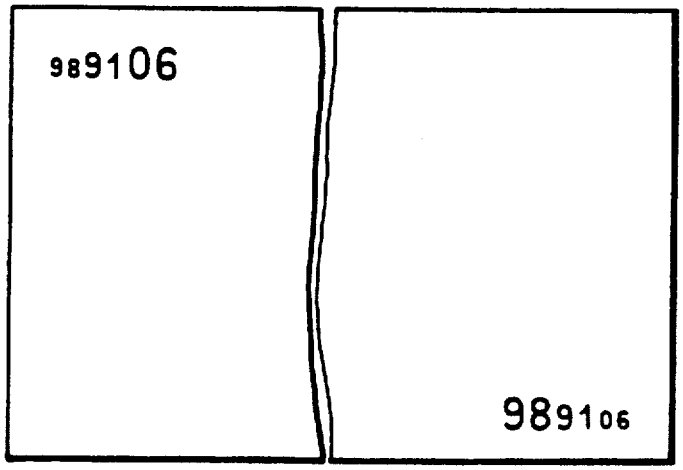

The digits of the numbers of the FIG. 6 document vary smoothly in pairs, in both height and width. All digits are in the above-mentioned fifth type style. The first two digits "9" and "8" of the number in the top left-hand corner and the last two digits "0" and "6" of the number in the bottom right-hand corner are all of the smallest height and width. The last two digits "0" and "6" of the top left-hand number and the first two digits "9" and "8" of the bottom right-hand number are all of the greatest height and width. The middle pairs of digits are of an intermediate height and width.

Figure 7:
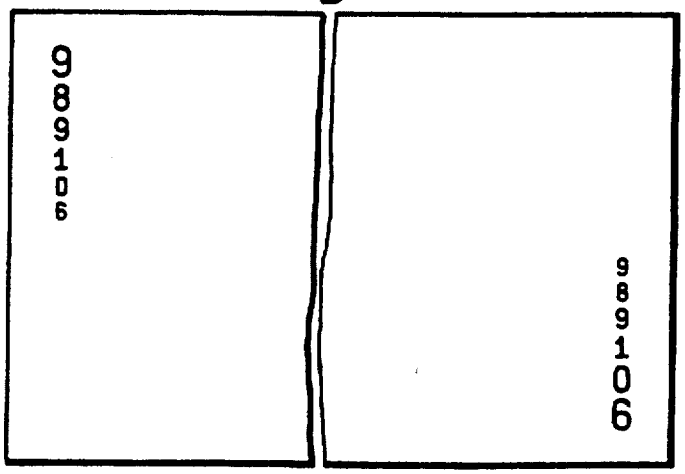

In the FIG. 7 document, the same number, which occurs in both the top left-hand corner and the bottom right-hand top corner, is intended to be read vertically from top to bottom (i.e. as 989106). The digits shown are in the above-mentioned fifth type style and the heights and widths of the digits vary progressively from digit to digit. The direction of the graduation of digits is reserved as between the left-hand and right-hand numbers; the greatest height and width is to be seen in the first "9" of the top left-hand number and the final "6" of the bottom right-hand number.

The documents of FIGS. 2 to 6 may be printed in sheets on rotary printing presses with parallel 6-wheel letter-press printing boxes of the kind shown in FIG. 1 to print the numbers at right-angles to the direction of the rotation of the impression cylinder. The document of FIG. 7 may be similarly produced but with the use of six-wheel convex or barrel numbering boxes to print the numbers in a direction parallel to the direction of rotation of the impression cylinder.

It will be obvious to those skilled in the art that there are many variations, additional to those illustrated and described above, within the scope of this invention and available for its implementation.

We claim:

1. A series of documents which are identical except for a number composed of a set of alphabetical or numerical characters which uniquely identifies each document within the series and in which the number is printed twice on each document in diagonally opposite corners, characterized in that in each document in each representation of the identifying number on that document at least two alphabetical or numerical characters on the identifying number differs from one another, in addition to any differences in the letters or numerical values which they represent, in one or more visible characteristics, and in which in the two representations of the identifying number on each document the variation of physical characteristics of the characters of one of the two representations is reversed in direction in the other of the two representations of the identifying number.

*2. A series of documents which are identical in content except for a number composed of a set of alphabetical or numerical characters which uniquely identifies each document within the series, in which at least two characters of the identifying number differ from each other, in addition to any differences in the letters or digits which they represent, in one or more visible physical characteristics, and in which the identifying number appears twice on the document with the variation between characters in each number being different, one of the two identifying numbers being provided with the characters one above the other.*

*3. A series of documents as claimed in claim 2 in which the differing characters have different heights.*

*4. A series of documents as claimed in claim 2 in which the differing characters have different widths.*

*5. A series of documents as claimed in claim 2 in which the differing characters are in different styles of type.*

*6. A series of documents as claimed in claim 2 in which the pitch of the characters varies, at least between the characters which exhibit varying visible physical characteristics.*

*7. A series of documents as claimed in claim 2 in which each of the characters of the identifying number includes an underline which is discrete from the underline of the adjacent character or characters.*

*8. A series of documents as claimed in claim 2, in which the variation of physical characteristics of the characters of one of the two numbers is reversed in direction in the other of the two numbers.*

* * * * *